(12) United States Patent
Kwon et al.

(10) Patent No.: US 11,049,648 B2
(45) Date of Patent: Jun. 29, 2021

(54) COIL STRUCTURE OF WIRELESS POWER TRANSMITTER

(71) Applicant: LG ELECTRONICS INC., Seoul (KR)

(72) Inventors: Taewook Kwon, Seoul (KR); Bongsik Kwak, Seoul (KR); Jeongkyo Seo, Seoul (KR); Beomseok Chae, Seoul (KR); Jaesoon Kwon, Seoul (KR); Sungkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 244 days.

(21) Appl. No.: 16/339,988

(22) PCT Filed: Jun. 28, 2017

(86) PCT No.: PCT/KR2017/006816
§ 371 (c)(1),
(2) Date: Dec. 27, 2019

(87) PCT Pub. No.: WO2018/066789
PCT Pub. Date: Apr. 12, 2018

(65) Prior Publication Data
US 2020/0135391 A1    Apr. 30, 2020

Related U.S. Application Data

(60) Provisional application No. 62/405,253, filed on Oct. 7, 2016.

(51) Int. Cl.
*H01F 38/14*    (2006.01)
*H02J 50/12*    (2016.01)
(Continued)

(52) U.S. Cl.
CPC ......... *H01F 38/14* (2013.01); *H01F 27/2804* (2013.01); *H02J 50/12* (2016.02);
(Continued)

(58) Field of Classification Search
None
See application file for complete search history.

(56) References Cited

U.S. PATENT DOCUMENTS

2014/0125140 A1    5/2014 Widmer et al.
2014/0203769 A1*   7/2014 Keeling ............... H02J 50/80
                                                      320/108

(Continued)

FOREIGN PATENT DOCUMENTS

KR    10-2015-0047085 A    5/2015
KR    10-2015-0082419 A    7/2015
(Continued)

*Primary Examiner* — Jared Fureman
*Assistant Examiner* — Aqeel H Bukhari
(74) *Attorney, Agent, or Firm* — Birch, Stewart, Kolasch & Birch, LLP

(57) ABSTRACT

According to an embodiment of the present invention, a resonator transmitting power in a resonant mode includes: a first coil having a wire group including three wires arranged in line and alternately extended in first direction and second direction orthogonal to the first direction; and a second coil including three sub-coils and ferrite plates, and the first coil may be stacked adjacent to the second coil, and the first coil may correspond to a resonance coil driven in the resonance mode and the second coil may correspond to an induction coil driven in an induction mode, respectively.

15 Claims, 14 Drawing Sheets

(51) Int. Cl.
*H02J 50/80* (2016.01)
*H01F 27/28* (2006.01)
*H02J 50/40* (2016.01)

(52) U.S. Cl.
CPC ............ *H02J 50/402* (2020.01); *H02J 50/80* (2016.02); *H01F 2027/2809* (2013.01)

(56) References Cited

U.S. PATENT DOCUMENTS

| | | |
|---|---|---|
| 2016/0013658 A1 | 1/2016 | Kohara et al. |
| 2016/0211702 A1 | 7/2016 | Muratov et al. |
| 2017/0011837 A1* | 1/2017 | Hassan-Ali ......... H01F 27/2804 |
| 2017/0207664 A1* | 7/2017 | Garrity ................... H02J 50/12 |
| 2018/0033544 A1* | 2/2018 | Nakajima ............. H01F 27/327 |

FOREIGN PATENT DOCUMENTS

| | | |
|---|---|---|
| KR | 10-2016-0051501 A | 5/2016 |
| KR | 10-2016-0055004 A | 5/2016 |

* cited by examiner

[FIG. 1]
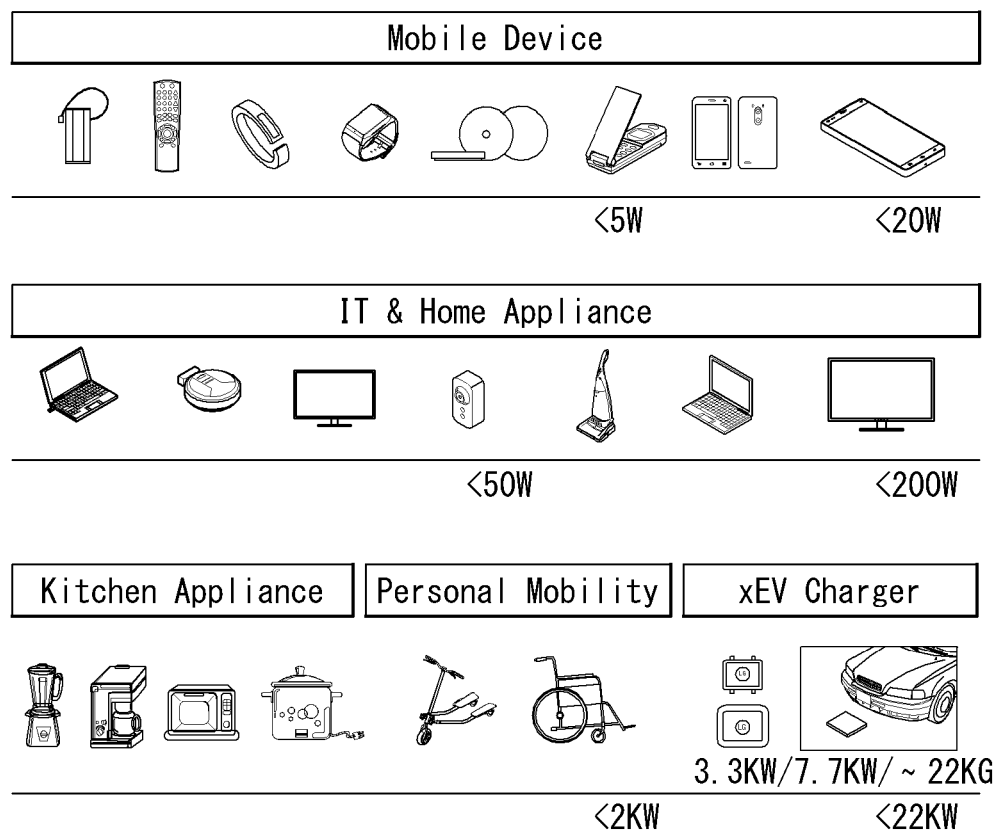

[FIG. 2]
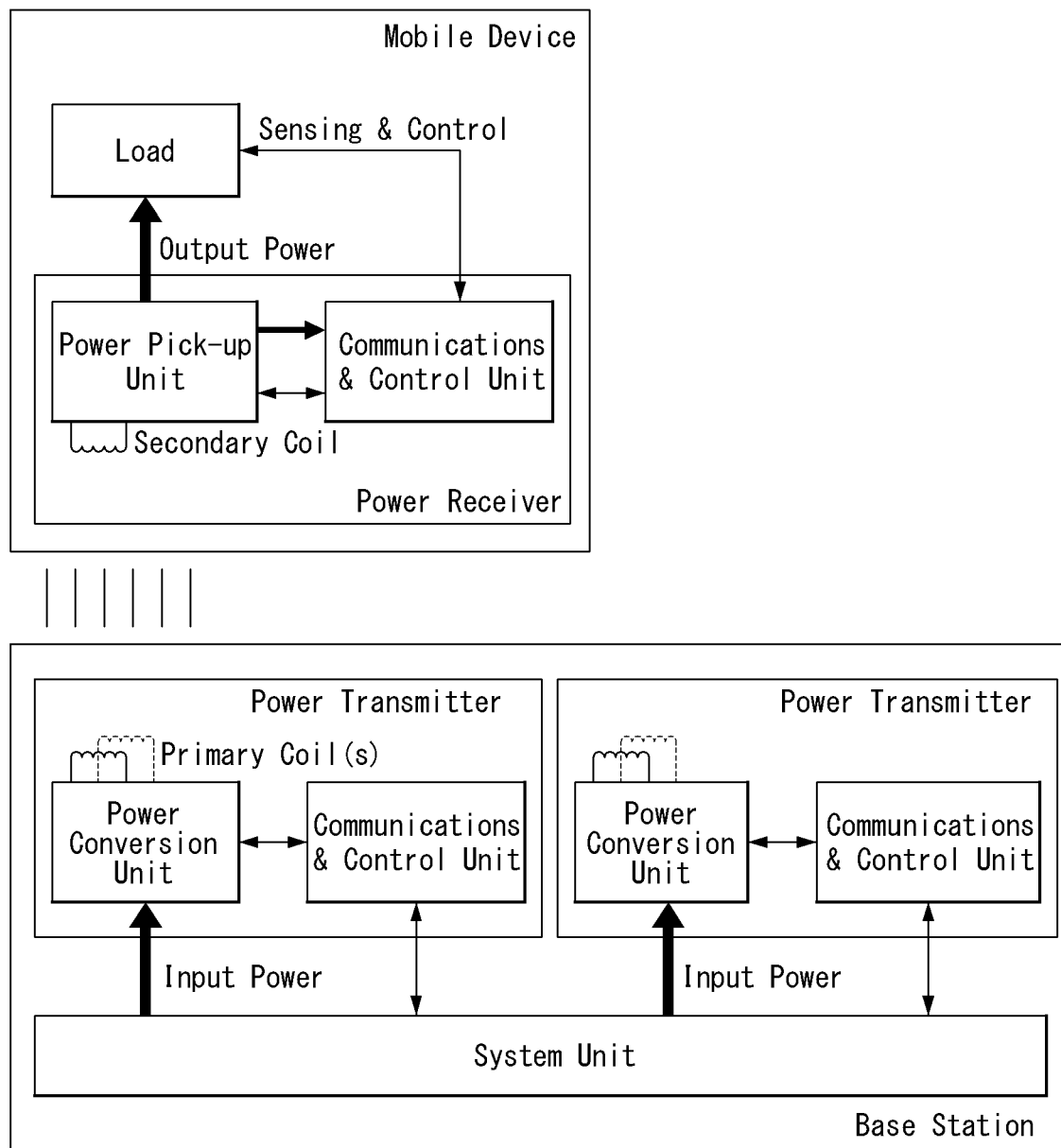

[FIG. 3]
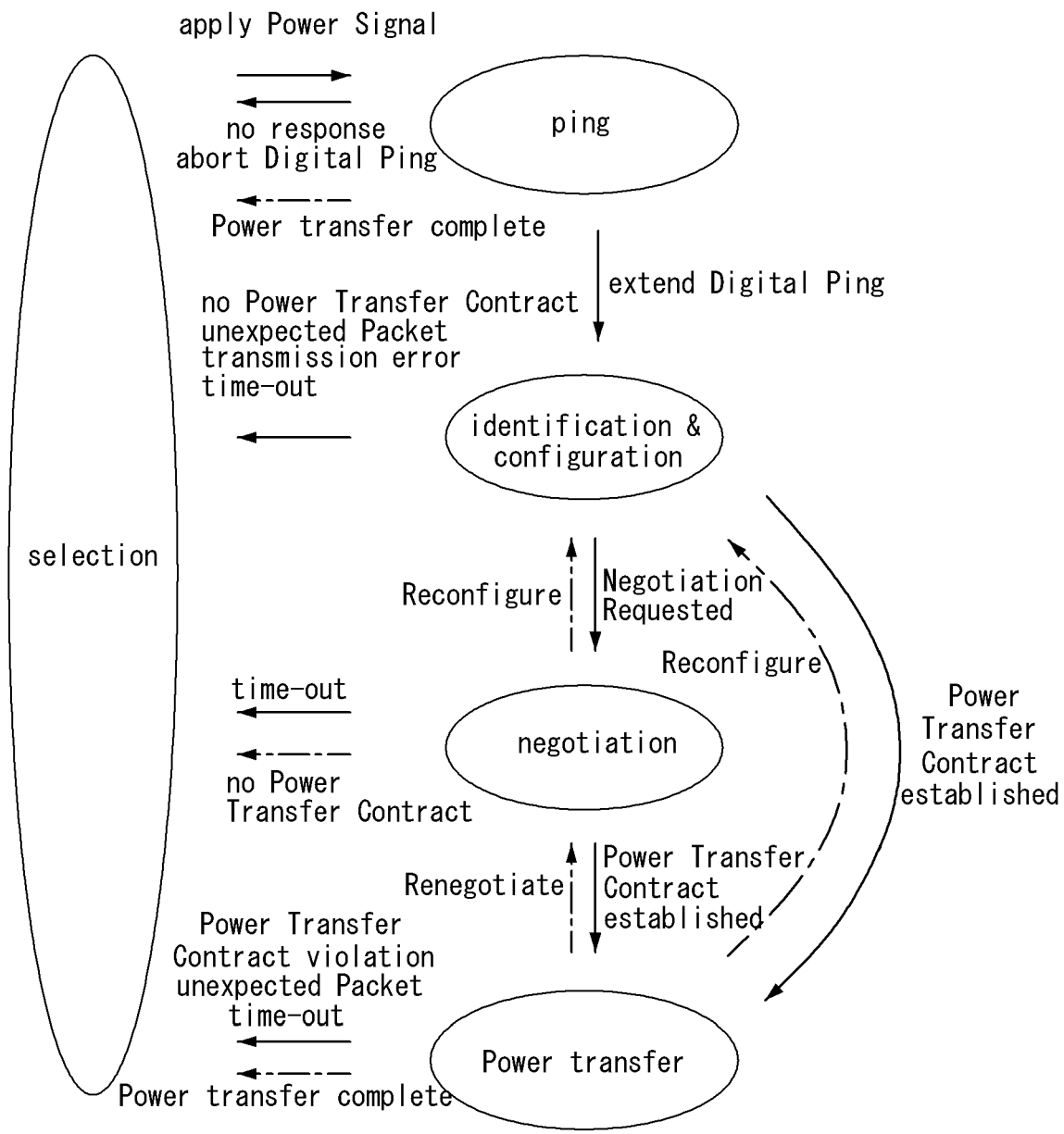

[FIG. 4]
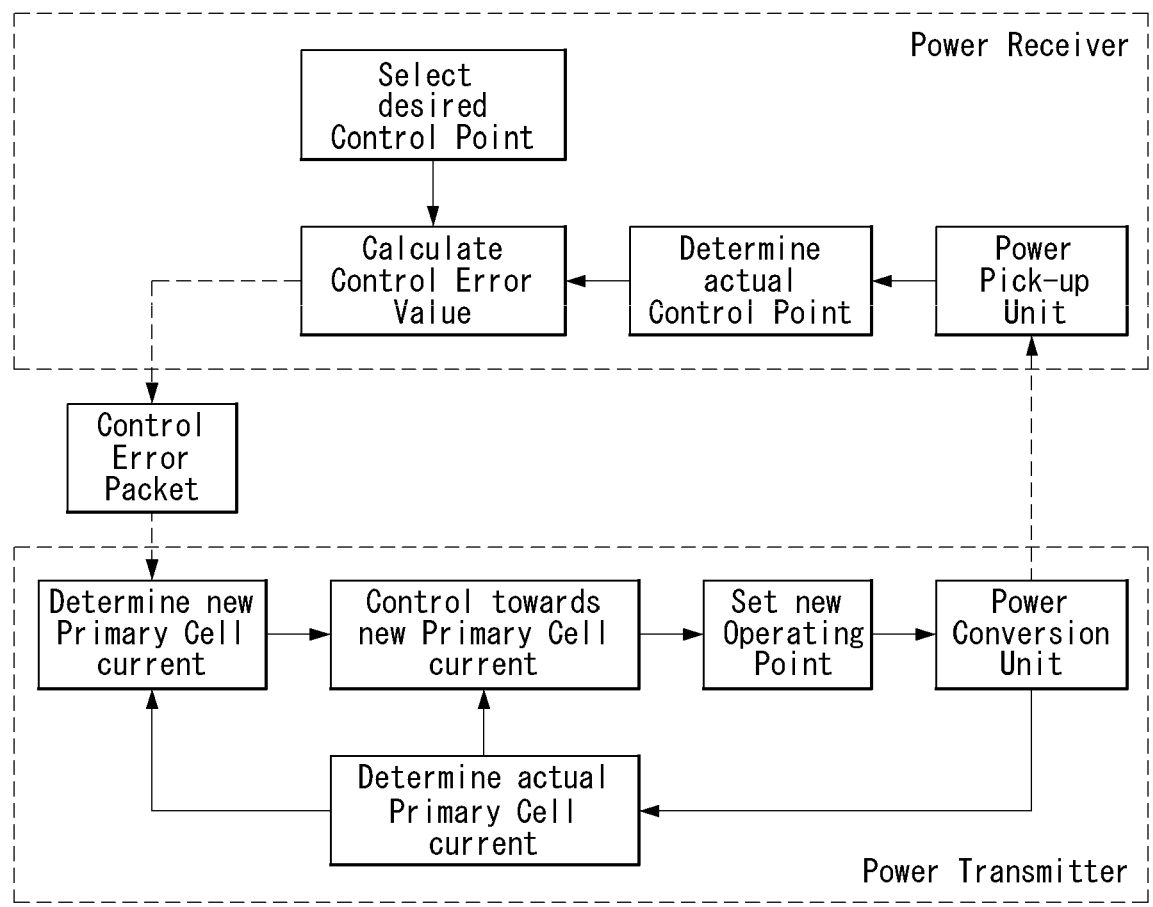

[FIG. 5]
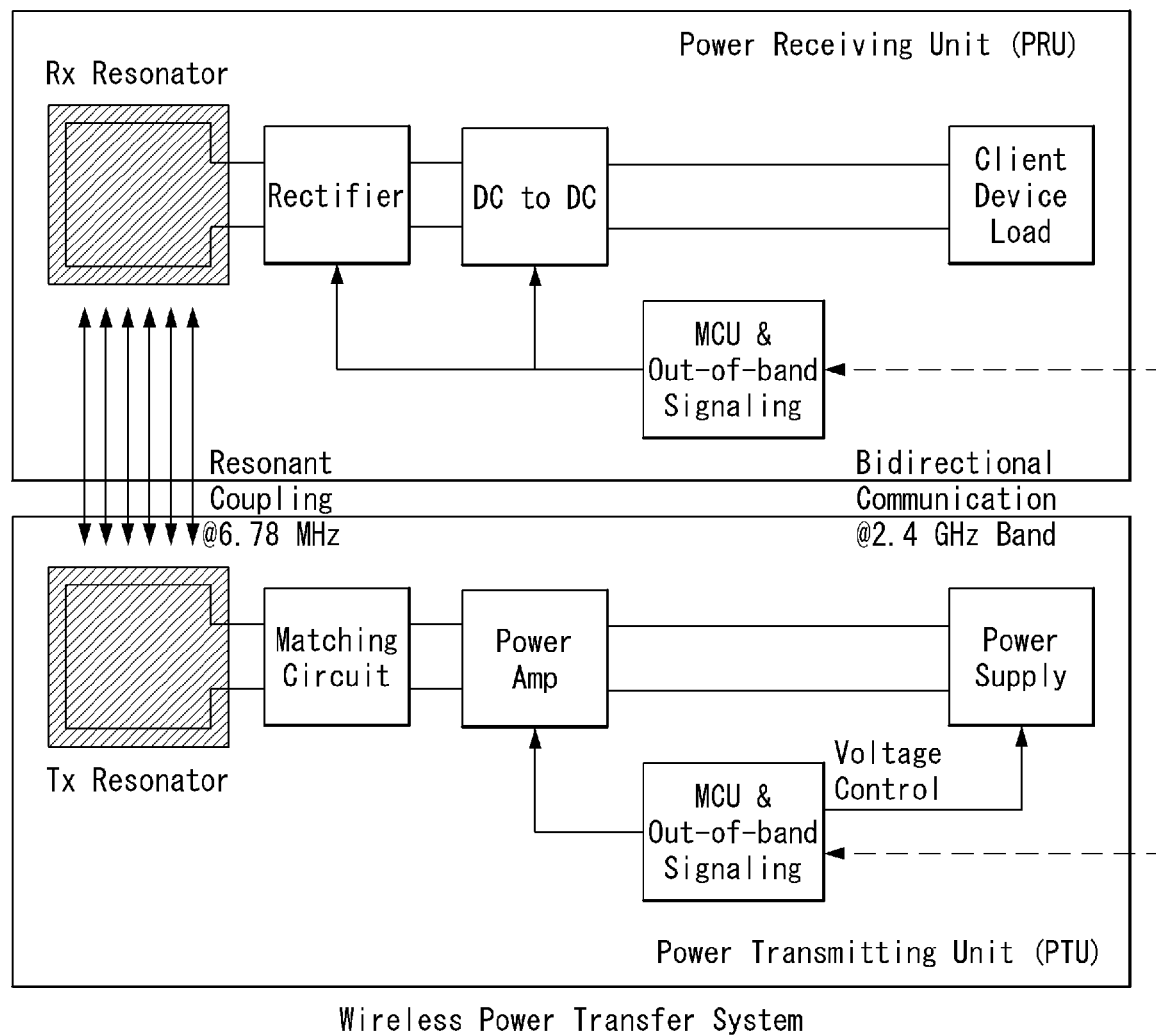
Wireless Power Transfer System

[FIG. 6]

|  | $P_{TX\_IN\_MAX'}$ | Minimum PRU Support Requirements |
|---|---|---|
| Class 1 | TBD | 1 x Category 1 |
| Class 2 | 10 W | 1 x Category 1, 2, or 3 |
| Class 3 | 16 W | 2 x Category 1, 2, or 3, or 1 x Category 4 |
| Class 4 | 22 W | 3 x Category 1, 2, or 3, or 1 x Category 4 |
| Class 5 | TBD | TBD |

[FIG. 7]

| PRU | $P_{RX\_OUT\_MAX'}$ | Example Application |
|---|---|---|
| Category 1 | TBD | BT headset |
| Category 2 | 3.5W | Feature Phone |
| Category 3 | 6.5W | Smart Phone |
| Category 4 | TBD | Tablet |
| Category 5 | TBD | Laptop |

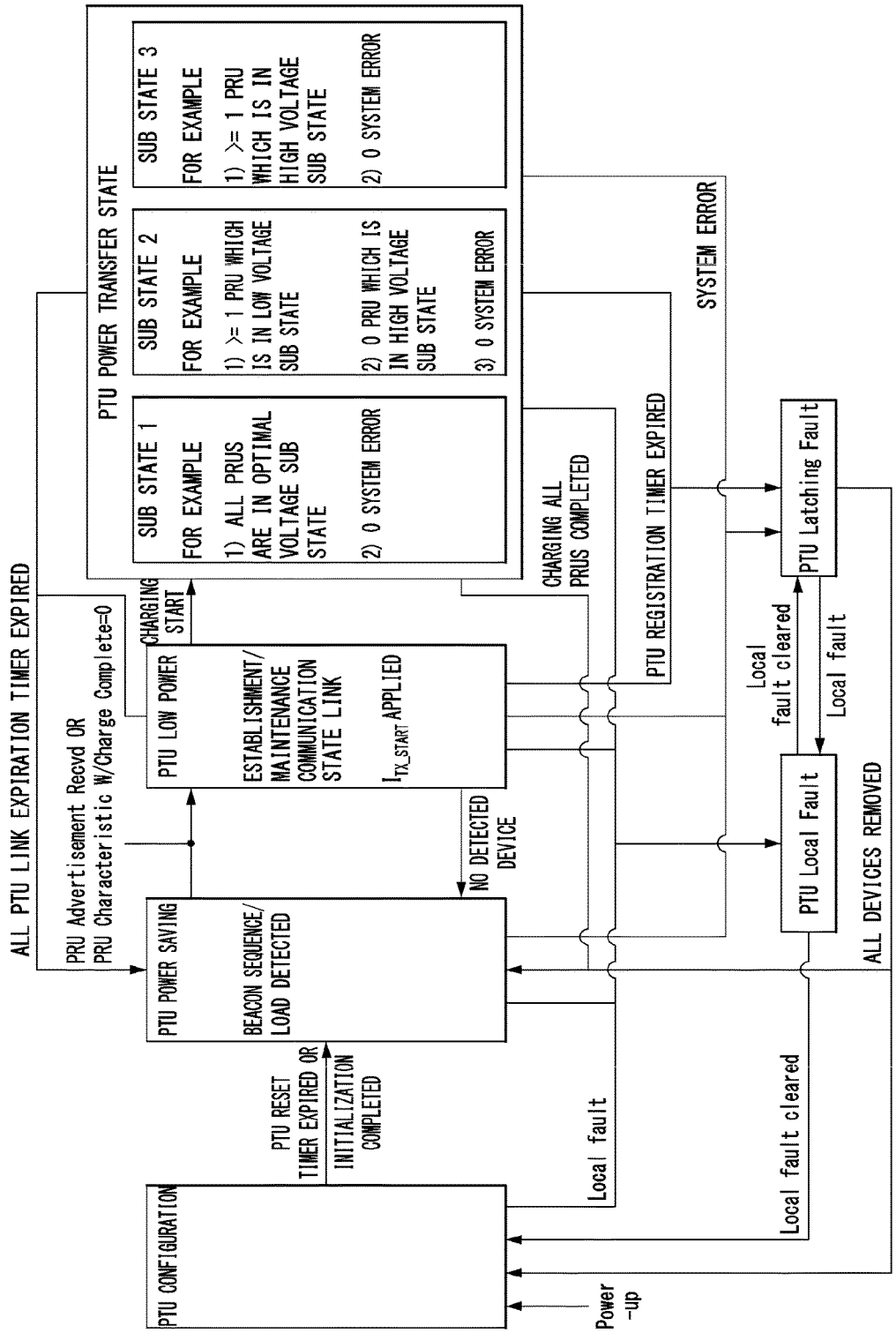
[FIG. 8]

[FIG. 9]
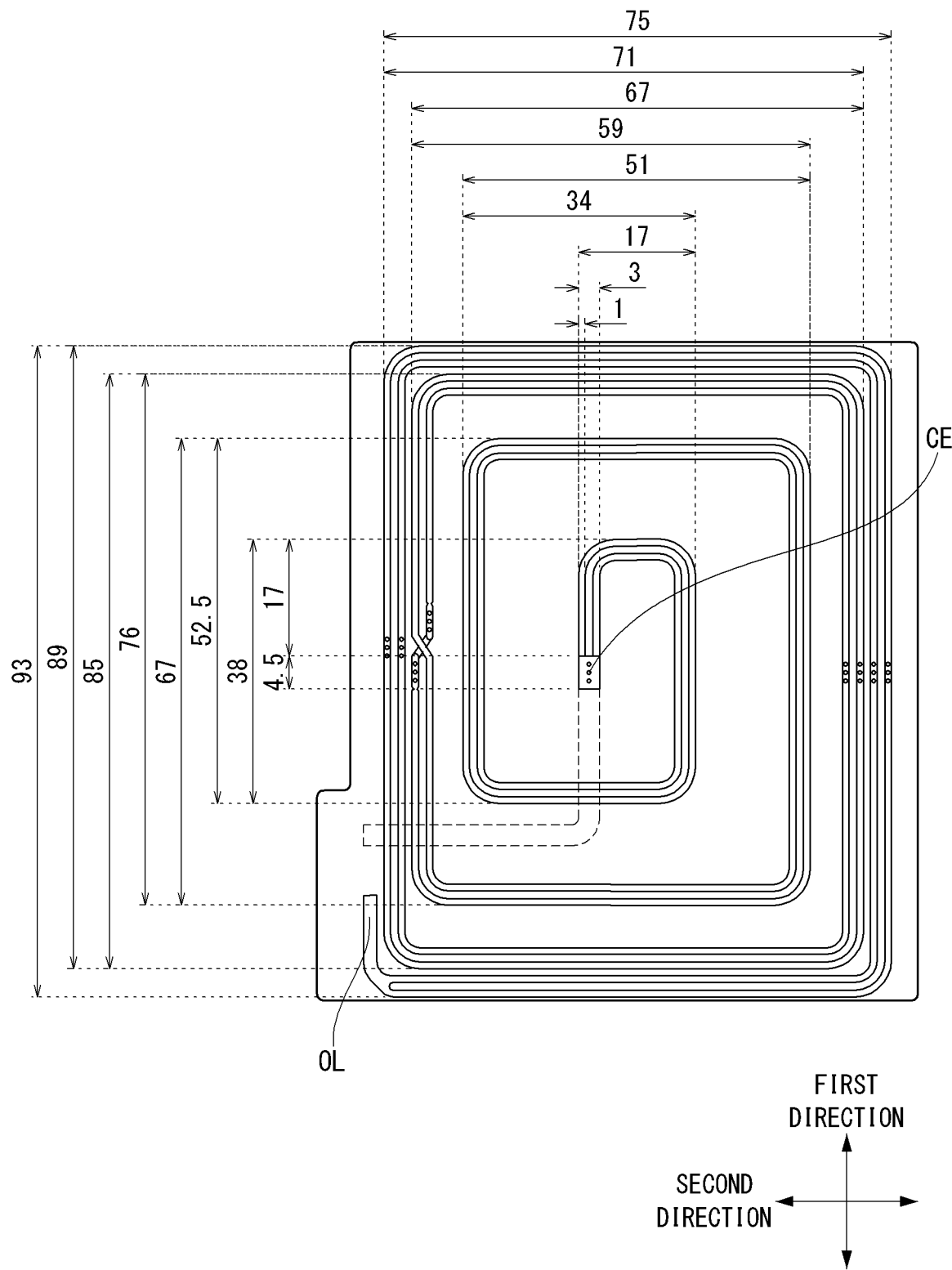

[FIG. 10]
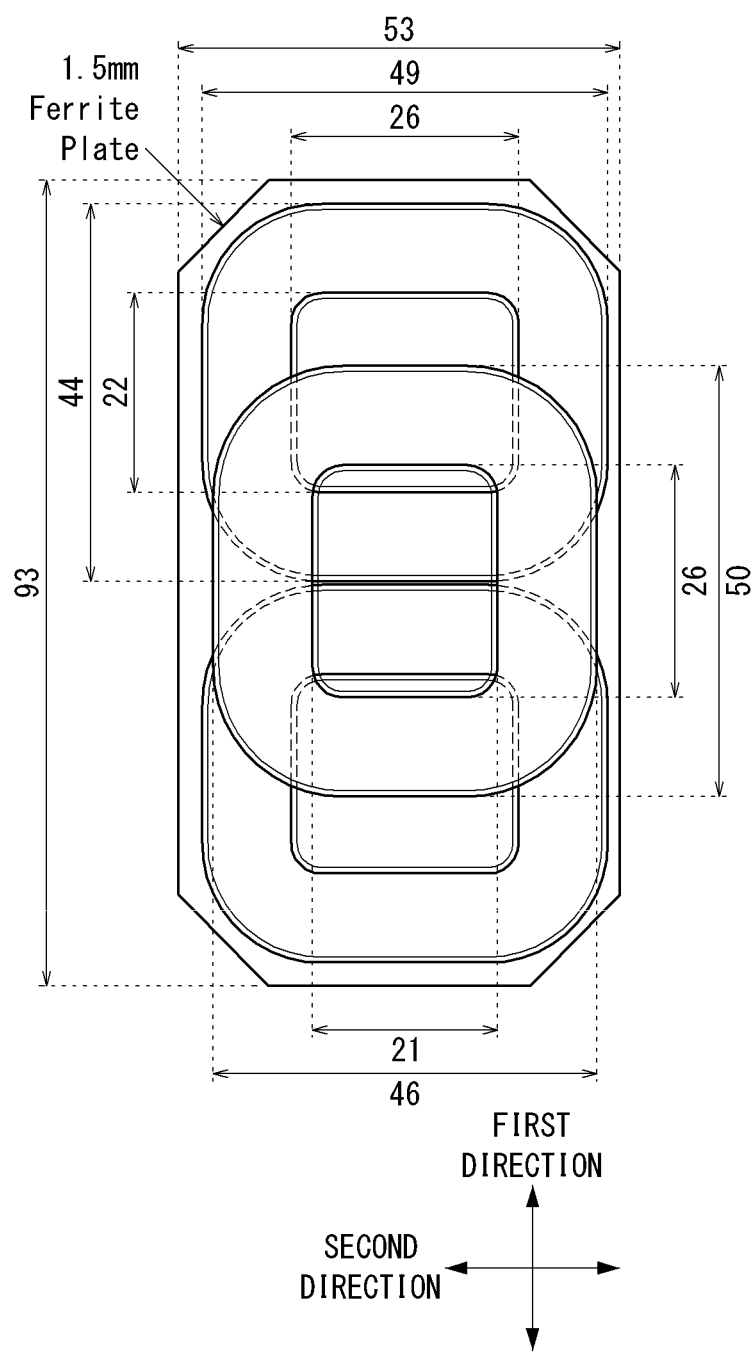

[FIG. 11]
|  | Center coil | Side coil |
|---|---|---|
| NUMBER OF TURNS | 12 | 11 |
| SIZE | 44 x 49 mm | 50 x 46 mm |
| WIRE TYPE | Litz wire (105 strands of 0.08mm) | |
| THICKNESS | 1.1mm | |
[FIG. 12]
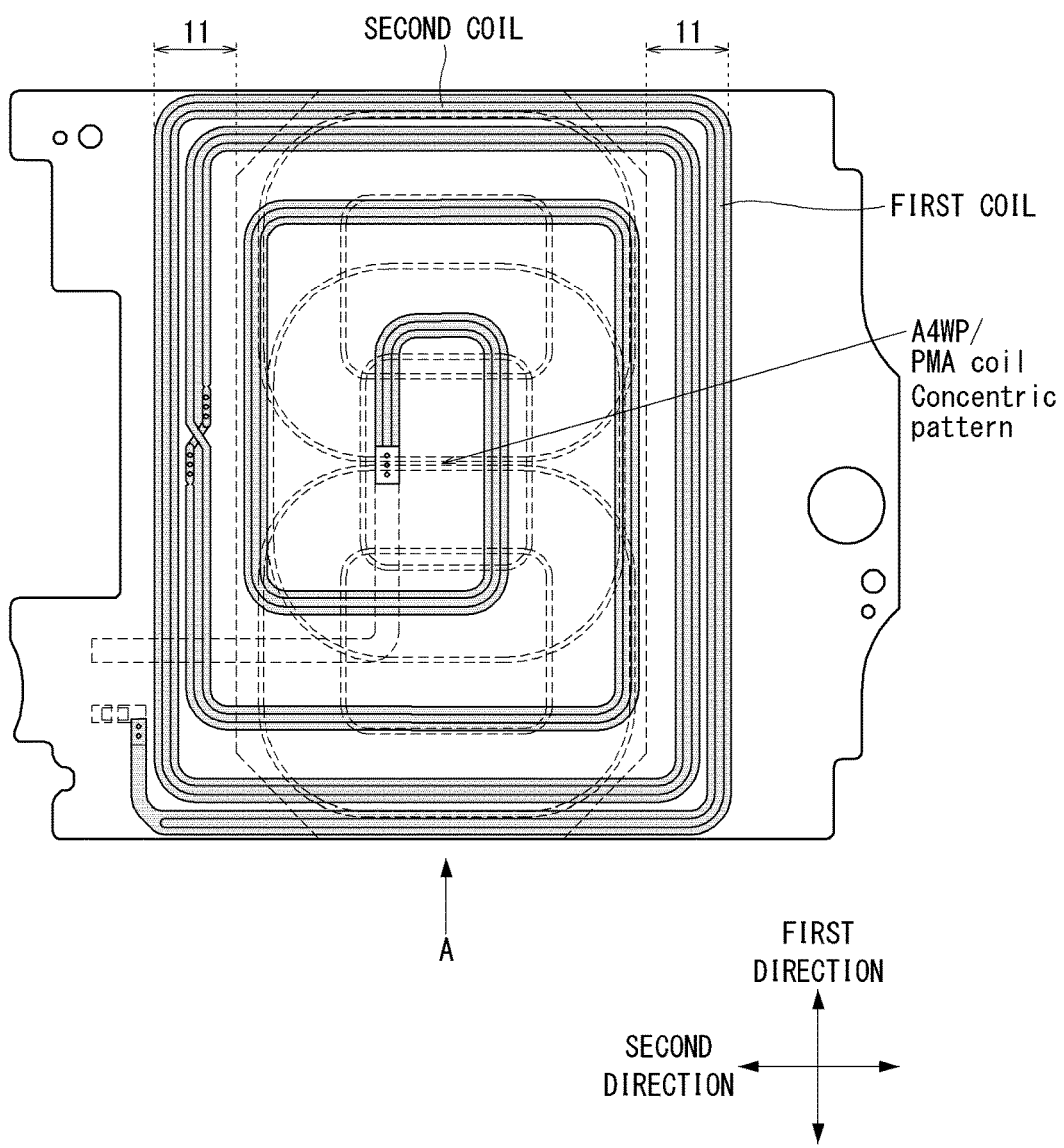

[FIG. 13]
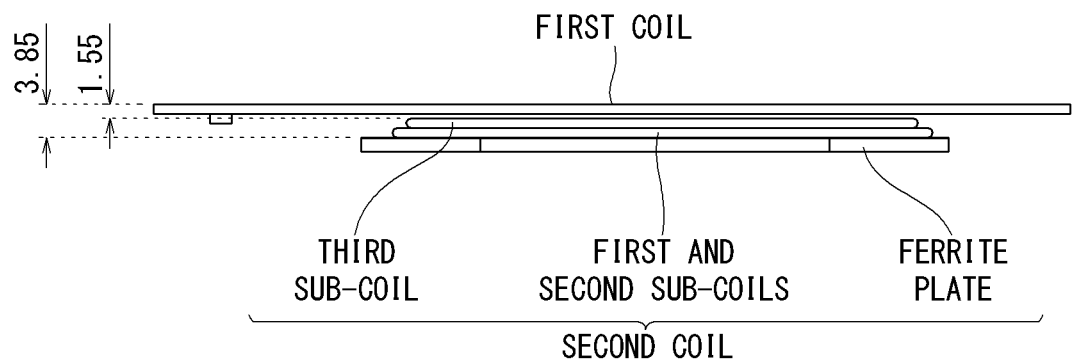

[FIG. 14]

| Min-coupling, $P_{BOOT}$ | | | Max coupling, $P_{MIN}$ | | |
|---|---|---|---|---|---|
| Set electronic load to draw 1 watt(s). | | | Set electronic load to draw 0.1 watt(s). | | |
| Actual $I_{TX}$ | $V_{RECT}$ | OFFSET func err | Actual $I_{TX}$ | $V_{RECT}$ | OFFSET func err |
| 1591.0 mArms | 13.90 V | 2.45E-03 | 1591.0 mArms | 19.01 V | 1.87E-05 |
| 1471.0 mArms | 12.60 V | 2.21E-04 | 1471.0 mArms | 17.49 V | 8.09E-05 |
| 1352.0 mArms | 11.36 V | 8.75E-04 | 1351.0 mArms | 15.95 V | 4.01E-05 |
| 1230.0 mArms | 10.11 V | 5.47E-04 | 1231.0 mArms | 14.42 V | 1.36E-04 |
| 1111.0 mArms | 8.90 V | 6.56E-05 | 1111.0 mArms | 12.90 V | 4.88E-05 |
| 991.0 mArms | 7.66 V | 1.57E-04 | 991.0 mArms | 11.39 V | 5.91E-05 |
| 872.0 mArms | 6.47 V | 5.19E-04 | 872.0 mArms | 9.87 V | 1.20E-07 |
| 827.0 mArms | 6.00 V | 2.60E-04 | 752.0 mArms | 8.35 V | 1.87E-05 |
| | | 0.0252 | | | 0.0071 |

| $V_{RECT}$ shall be greater than (>) $V_{BOOT}$ when $I_{TX}$ is equal to $\min(I_{TX\_MIN}, I_{TX\_LONG\_BEACON\_MIN})$ | |
|---|---|
| $V_{RECT} @ I_{TX\_MIN}$ | 5.71 V |
| $V_{RECT} @ I_{TX\_LONG\_BEACON\_MIN}$ | 5.71 V |
| $V_{BOOT}$ | 5.00 V |
| PASS | |

| $V_{RECT}$ shall be less than (<) $V_{HIGH}$ when $I_{TX}$ is less than or equal to $I_{TX\_NOMINAL}$. | |
|---|---|
| $V_{RECT} @ I_{TX\_NOMINAL}$ | 10.86 V |
| $V_{HIGH}$ | 16.00 V |
| PASS | |
| $V_{RECT}$ shall be less than (<) $V_{MAX}$ when $I_{TX}$ is equal to $I_{TX\_MAX}$. | |
| $V_{RECT} @ I_{TX\_MAX}$ | 16.58 V |
| $V_{MAX}$ | 20.00 V |
| PASS | |
| $V_{RECT}$ shall be less than (<) $V_{ABS\_MAX}$ when $I_{TX}$ is equal to $I_{TX\_ABS\_MAX}$. | |
| $V_{RECT} @ I_{TX\_ABS\_MAX}$ | 17.85 V |
| $V_{ABS\_MAX}$ | 24.00 V |
| PASS | |

[FIG. 15]
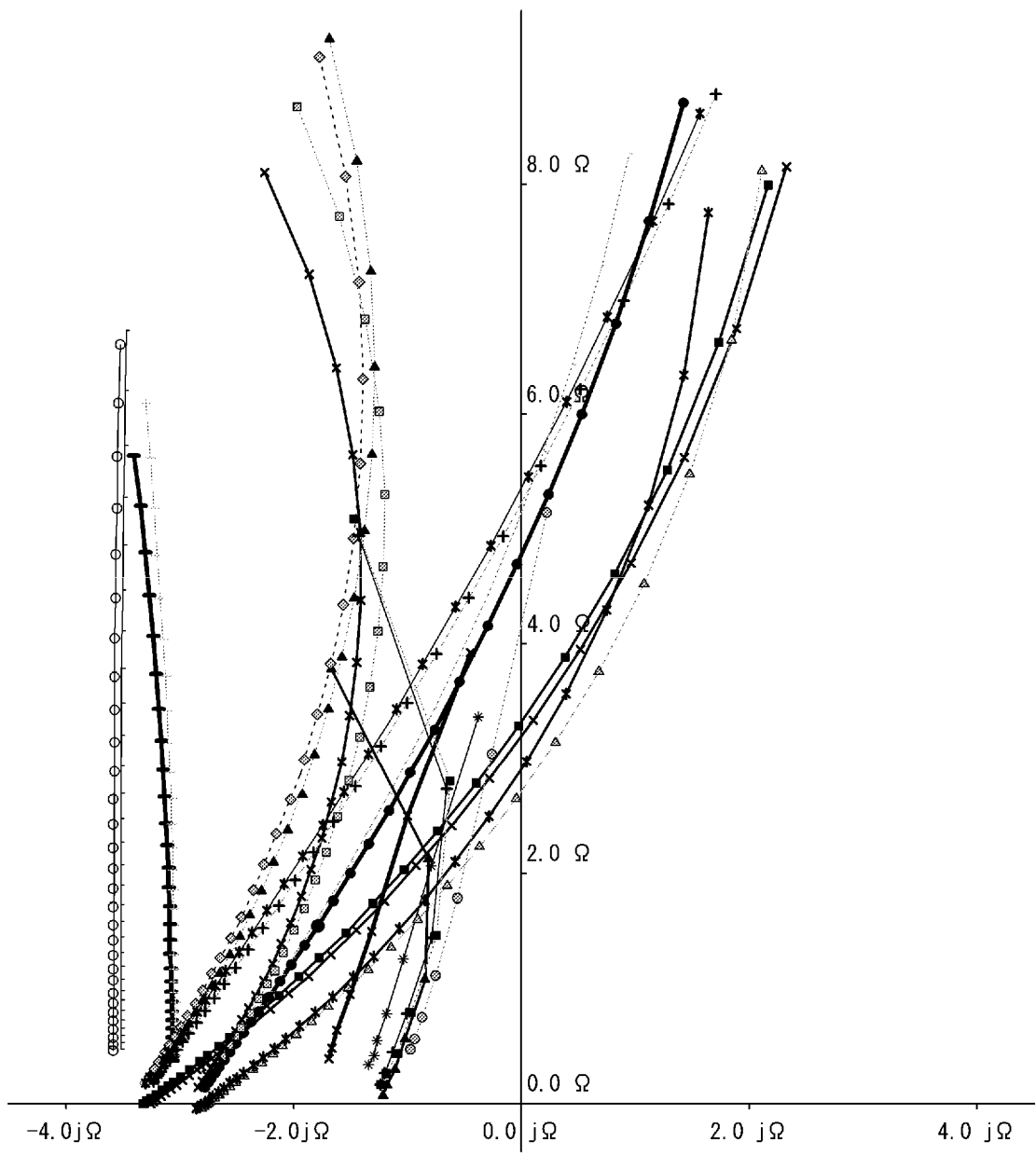

[FIG. 16]

| 3-1 RCE: | | 77.83% | |
|---|---|---|---|
| | | | |
| Q: | 22.21 | at f: | 6.61 MHz |
| L (uH): | 1.1866158 | at f: | 6.63 MHz |
| Max Z21: | 3.7422638 | MAX Z21 / MIN Z21 < 2.25 | |
| Min Z21: | 2.4042137 | | |
| Max k: | 0.1404174 | PASS | |
| Min k: | 0.0946302 | | |
| Provide locations for max/min k/Z21 | | PASS | |

COIL STRUCTURE OF WIRELESS POWER TRANSMITTER

CROSS REFERENCE TO RELATED APPLICATIONS

This application is the National Phase of PCT International Application No. PCT/KR2017/006816, filed on Jun. 28, 2017, which claims priority under 35 U.S.C. 119(e) to U.S. Provisional Application No. 62/405,253, filed on Oct. 7, 2016, all of which are hereby expressly incorporated by reference into the present application.

TECHNICAL FIELD

The present invention proposes a coil structure of a wireless power transmitter that may support both an inductive mode and a resonant mode.

BACKGROUND ART

A contactless wireless charging scheme is an energy transfer scheme that removes wires and transfers electromagnetic energy in a scheme that transmits energy through the existing wire and uses the transmitted energy as a power source of an electronic device. In a contactless wireless transmission scheme, there are an electromagnetic induction scheme and a resonance scheme. The electromagnetic induction scheme is a scheme that generates a magnetic field through a power transmission coil (primary coil) in a power transmitting unit and locates a reception coil (secondary coil) at a position where current may be induced to transfer power. The resonance scheme is a scheme that transmits energy by using a resonance phenomenon between the transmission coil and the reception coil. However, resonant mode energy coupling between coils is used by configuring a system to apply a resonance frequency of the primary coil and the resonance frequency of the secondary coil similarly.

DISCLOSURE

Technical Problem

An object of the present invention is to propose a coil structure of a wireless power transmitter with high compatibility for supplying power irrespective of which mode/standard a wireless power receiver supports.

Technical Solution

According to an embodiment of the present invention, a resonator transmitting power in a resonant mode includes: a first coil having a wire group including three wires arranged in line and alternately extended in first direction and second direction orthogonal to the first direction; and a second coil including three sub-coils and ferrite plates, and the first coil may be stacked adjacent to the second coil, and the first coil may correspond to a resonance coil driven in the resonance mode and the second coil may correspond to an induction coil driven in an induction mode, respectively.

Further, a width of each of the three wires may be 0.5 to 1.5 mm.

In addition, the first coil may be configured in a rectangular shape having a space therein.

Further, a total length of the first coil may be 92 to 94 mm and a total width may be 74 to 76 mm.

In addition, the wire group may be sequentially extended from a center of the first coil with 16 to 18 mm in the first direction, 16 to 18 mm in the second direction, 37 to 39 mm in the first direction, 33 to 35 mm in the second direction, 51.5 to 53.5 mm in the second direction, 50 to 52 mm in the second direction, 66 to 68 mm in the first direction, 58 to 60 mm in the second direction, 75 to 77 mm in the first direction, 67 mm in the second direction, 84 to 86 mm in the first direction, 70 to 72 mm in the second direction, 88 to 90 mm in the first direction, 74 to 76 mm in the second direction, 92 to 94 mm in the first direction, and 74 to 76 mm in the second direction and connected to a terminal of the first coil.

Further, when the three sub-coils have first to third sub-coils, the first sub-coil may be arranged in line neighboring to the second sub-coil in the first direction and the first and second sub coils may be stacked on the ferrite plate, and the third sub-coil may be stacked between the first and second sub-coils.

In addition, the first to third sub-coils may have a square-shaped frame with rounded corners, and the square-shaped frame may have a through hole having a rectangular shape with rounded corners at center.

Further, the first and second sub-coils may be configured to have the same size and configured to have a different size from the third sub-coil.

In addition, the number of turns of wires of the first and second sub-coils may be 11 and the number of wire of the third sub-coil may be 12, and thicknesses of the first to third sub-coils may be 0.6 to 1.6 mm.

Further, a length of the first and second sub-coils in the first direction may be 43 to 45 mm and the length in the second direction may be 48 to 50 mm, and the length of the through-hole of the first and second sub-coils in the first direction may be 21 to 23 mm and the length in the second direction may be 25 to 27 mm.

In addition, the length of the third sub-coil in the first direction may be 49 to 51 mm and the length in the second direction may be 45 to 47 mm, and the length of the through-hole of the third sub-coil in the first direction may be 25 to 27 mm and the length in the second direction may be 20 to 22 mm.

Further, the length of the ferrite plate in the first direction may be 92 to 94 mm and the length in the second direction may be 52 to 54 mm.

In addition, when the first coil is stacked on the third sub-coil included in the second coil, a distance from an upper surface of the ferrite plate up to the upper surface of the first coil may be 2.85 to 4.85 mm and the distance from the upper surface of the third sub-coil up to the upper surface of the first coil may be 0.55 to 2.55 mm.

Further, the second coil may be positioned 10 to 12 mm away from both outsides of the first coil in a plane.

Further, a wireless power transmitter transmitting power to a wireless power receiver according to another embodiment of the present invention includes: a power supply unit supplying the power to the wireless power transmitter; a matching circuit performing impedance matching; a resonator transmitting the power to the wireless power receiver; and a control unit performing out-of-band communication, and the resonator may include a first coil having a wire group including three wires arranged in line and alternately extended in first direction and second direction orthogonal to the first direction, and a second coil including three sub-coils and ferrite plates, and the first coil may be stacked adjacent to the second coil, and the first coil may correspond to a resonance coil driven in the resonance mode and the second coil may correspond to an induction coil driven in an induction mode, respectively.

Advantageous Effects

According to an embodiment of the present invention, there is an effect that a power transmitter can charge a power receiver of various mode/standards, thereby enhancing compatibility.

Further, according to an embodiment of the present invention, there is an effect of providing the power receiver that has excellent performance in terms of uniformity of a charging area, an amount of change in impedance, and charging efficiency.

Besides, various effects according to the embodiment of the present invention will be described below in detail.

DESCRIPTION OF DRAWINGS

FIG. 1 illustrates an embodiment of various electronic devices into which a wireless charging system is introduced.

FIG. 2 illustrates a wireless power transmission/reception system according to an embodiment of the present invention.

FIG. 3 is a block diagram illustrating a power transmission/reception method in an inductive mode.

FIG. 4 illustrates a power transfer control method in the inductive mode.

FIG. 5 illustrates a wireless power transmission system to which the present invention may be applied.

FIG. 6 illustrates a class of a PTU according to an embodiment of the present invention.

FIG. 7 illustrates a category of a PRU according to an embodiment of the present invention.

FIG. 8 illustrates a PTU state model according to an embodiment of the present invention.

FIG. 9 illustrates a first coil for a resonant mode included in a resonator according to an embodiment of the present invention.

FIG. 10 illustrates a second coil for an inductive mode included in the resonator according to an embodiment of the present invention.

FIG. 11 illustrates parameters for defining the second coil according to an embodiment of the present invention.

FIG. 12 is a plan view of a resonator according to an embodiment of the present invention.

FIG. 13 is a side view of the resonator according to an embodiment of the present invention as viewed from direction A of FIG. 12.

FIG. 14 illustrates a uniformity test result for a power transmitter including the resonator according to an embodiment of the present invention.

FIG. 15 is a graph of an experimental result illustrating an impedance change amount for each position of the power transmitter depending on the position of the power receiver.

FIG. 16 illustrates an experimental result for resonate coupling efficiency (RCE) for a power transmitter including a resonator geometry according to an embodiment of the present invention.

MODE FOR INVENTION

Terms used in this specification adopt general terms which are currently widely used as possible by considering functions in this specification, but the terms may be changed depending on an intention of those skilled in the art, a precedent, or emergence of new technology. Further, in a specific case, a term which an applicant arbitrarily selects is present and in this case, a meaning of the term will be disclosed in a description part of the corresponding embodiment. Accordingly, it is apparent that a term used in this specification should be interpreted based on not just the term but a substantial meaning and contents throughout this specification.

Furthermore, the embodiments are described in detail below with reference to the accompanying drawings and contents described in the accompanying drawings, but the present invention is not restricted or limited by the embodiments.

Hereinafter, preferred embodiments of the present invention will be described in more detail with reference to the accompanying drawings.

FIG. 1 illustrates an embodiment of various electronic devices into which a wireless charging system is introduced. In FIG. 1, electronic devices are classified according to an amount of power transmitted and received in the wireless charging system.

Small power (approximately 5 W or less or approximately 20 W or less) wireless charging may be applied to wearable devices such as a smart clock and smart glass and mobile/portable electronic devices such as an earphone, a remote controller, a smart phone, PDA, a tablet PC, etc. Medium power (approximately 50 W or less or approximately 200 W or less) may be applied to medium and small appliances such as notebook computers, robot cleaners, TVs, sound devices, cleaners, monitors, and the like. In addition, large power (approximately 2 kW or less or 22 kW or less) wireless charging may be applied to kitchen appliances such as a blender, a microwave oven, and an electric rice cooker, personal mobile devices such as a wheelchair, an electric kickboard, and an electric bicycle, and an electronic device/moving means such as an electric vehicle, etc. The electronic devices/moving means illustrated in FIG. 1 may include a power receiver to be described below.

Hereinafter, small power and a mobile device will be mainly described, but this relates to an embodiment, and the wireless power transmission/reception method according to the present invention may be applied to various electronic devices described above.

Various organizations such as Wireless Power Consortium (WPC) and Alliance for Wireless Power (A4WP) standardize wireless power transmission/reception related technology for standardization of wireless power transmission/reception devices.

The recently developed wireless charging system may support low power transmission and reception up to approximately 5 W. However, recently, a size of a mobile device becomes large and a battery capacity also increases, in the case of such a low power charging system, there is a problem in that a charging time is long and efficiency is lowered, and as a result, a wireless charging system for supporting medium power transmission and reception of up to approximately 15 W to 20 W has been developed. At the same time, a wireless charging system having a resonance method added to charge a plurality of electronic devices has also been developed.

Hereinafter, an inductive mode/type/scheme wireless power transmission/reception system standardized in the WPC and a resonant (or shared) mode/type/scheme wireless power transmission/reception system standardized in the A4WP will be described.

In addition, hereinafter, the wireless power transmitter may be abbreviated as a power transmitter or a transmitter and the wireless power receiver may be abbreviated as a power receiver or a receiver.

Wireless Power Transmission/Reception System Standardized in WPC (Inductive Mode)

FIG. 2 illustrates a wireless power transmission/reception system according to an embodiment of the present invention.

In FIG. 2, the wireless power transmission/reception system includes a mobile device that receive power wirelessly and a base station.

The mobile device includes a power receiver that receives wireless power through a secondary coil and a load that receives and stores the power received by the power receiver and supplies the received and stored power to a device. In addition, the power receiver may include a power pick-up unit that receives a wireless power signal and converts the received wireless power signal into electric energy through the secondary coil and a communications and control unit that controls communication with the power transmitter and power signal transmission/reception (power transfer/reception). The mobile device may also be referred to below as a power reception device.

The base station as an apparatus that provides inductive power or resonant power may include one or more power transmitters and system units. The power transmitter may transmit the inductive/resonant power and control power transmission. The power transmitter may include a power conversion unit that generates a magnetic field through a primary coil(s) and converts/transmits the electric energy into a power signal and a communications and control unit that controls communication with the power receiver and power transfer so as to transmit the power at an appropriate level. The system unit may perform other operation controls such as input power provisioning, control of a plurality of power transmitters, and user interface control. The base station may also be referred to below as a power transmission device.

The power transmitter may control transmission power by controlling an operating point. The controlled operating point may correspond to a combination of a frequency (phase), a duty cycle, and a voltage amplitude. The power transmitter may control the transmitted power by adjusting at least one of the frequency (phase), the duty cycle/duty ratio, and an amplitude of input voltage. Further, the power transmitter may supply constant power and the power receiver may control the received power by controlling a resonant frequency.

A coil or coil portion may hereinafter be referred to as a coil assembly, a coil cell, or a cell, including the coil and at least one element adjacent to the coil.

Hereinafter, a power transfer method of the power transmitter/receiver operating in the inductive mode will be described first. However, a method for describing the inductive mode or at least one of phases included in the method may be used selectively or optionally in the resonant mode.

FIG. 3 is a block diagram illustrating a power transmission/reception method in an inductive mode.

In the wireless charging system according to the present invention, the wireless charging may be performed through five phases. The five phases may include a selection phase, a ping phase, an identification and configuration phase, a negotiation phase, and a power transfer phase and however, the negotiation phase may be omitted in the low power-mode power transmission/reception. That is, in the lower power mode, the power transmission/reception may be performed by four phases and in the intermediate power mode, the negotiation phase may be additionally performed.

In the selection phase, the power transmitter monitors contact/departure of an object with respect to an interface surface provided in the transmitter. As shown in FIG. 2, the wireless power transmitter may sense the contact of an external object by applying the power signal. In other words, the power transmitter applies a short power signal to the primary coil and senses the current of the primary coil generated by the power signal to monitor the presence of the external object. In addition, when the power transmitter receives signal strength information (packet) monitored in the selection phase and detects the object based on the received signal strength information (packet), the power transmitter may select whether the object is the power receiver or a simple external object (a key, a coin, etc.). For such a selection, the power transmitter may further perform at least one of the ping phase, the identification/configuration phase, and the negotiation phase.

In the ping phase, the power transmitter may perform digital ping and wait for the response of the power receiver. The digital ping represents the application/transmission of the power signal to detect and identify the power receiver. When the power transmitter finds the power receiver, the power transmitter may extend the digital ping to proceed to the identification/configuration phase.

In the identification/configuration phase, the power transmitter may identify the selected power receiver and obtain configuration information of the power receiver, such as a maximum power amount. In other words, the power transmitter may receive the identification/configuration information, obtain information on the power receiver, and use the information to establish a power transfer contract. This power transfer contract may include constraints on a plurality of parameters that characterize power transfer in a subsequent power transfer phase.

In the negotiation phase, the power receiver may negotiate with the power transmitter to create an additional power transfer contract. In other words, the power transmitter may receive a negotiation request/information from the power receiver and the negotiation phase may be performed only if a target receiver is identified as an intermediate power receiver in the identification/configuration phase. In the negotiation phase, additional parameters such as a guaranteed power level of the power transmitter and the maximum power of the power receiver may be negotiated. When the power receiver is a low-power receiver, the negotiation phase may be omitted and the identification/configuration phase may directly proceed to the power transfer phase.

In the power transfer phase, the power transmitter provides power wirelessly to the power receiver. The power transmitter receives control data for transmitted power to control power transfer accordingly. In addition, when restrictions of the parameters depending on the power transfer contract are violated during the power transfer, the power transmitter may stop the power transfer and proceed to the selection phase.

FIG. 4 illustrates a power transfer control method in the inductive mode.

In FIG. 4, each of the power transmitter and the power receiver may include a power conversion unit and a power pickup unit, respectively, as illustrated in FIG. 1.

In the power transfer phase of the inductive mode described above, the power transmitter and the power receiver may control the amount of power transferred by parallel communication with power transmission and reception. The power transmitter and the power receiver operate at a specific control point. The control point represents a combination of voltage and current provided at an output of the power receiver when the power transfer is performed.

In more detail, the power receiver selects a desired control point-desired output current/voltage, a temperature of a specific location of the mobile device, etc., and determines an actual control point which currently operates at present. The power receiver may calculate a control error value by using the desired control point and the actual control point and transmit the control error value as a control error packet to the power transmitter.

In addition, the power transmitter sets/controls a new operating point—the amplitude, the frequency, and the duty cycle—by using the received control error packet to control the power transfer. Accordingly, the control error packet is transmitted/received at a predetermined time interval in the power transfer phase and as the embodiment, the power receiver may set and transmit a control error value as a negative value in the case of intending to decrease the current of the power transmitter and set and transmit the control error value as a positive value in the case of intending to increase the current. As described above, in the inductive mode, the power receiver transmits the control error packet to the power transmitter to control the power transfer.

The resonance mode to be described below may operate in a different manner from that in the inductive mode. In the resonant mode, one power transmitter needs to be able to serve a plurality of power receivers simultaneously. However, in the case of controlling the power transfer as in the inductive mode described above, the power to be transferred is controlled by communication with one power receiver, and as a result, it may be difficult to control the power transfer for additional power receivers. Therefore, in the resonant mode of the present invention, a method is to be used, in which the power transmitter commonly transfers basic power and the power receiver controls a resonant frequency thereof to control the amount of received power. However, the method described in FIG. 4 is not completely excluded in the operation of the resonant mode and additional transmission power may be controlled by the method of FIG. 4.

Wireless Power Transmission/Reception System Standardized in A4WP (Resonant Mode)

FIG. 5 illustrates a wireless power transmission system to which the present invention may be applied.

A wireless power transmission system (hereinafter, referred to as an A4WP system) in the A4WP is defined such that one power transmitter unit (PTU) transmits power to one or more power receiver units (PRUs) (i.e., one-to-many transmission system). A power transmission frequency may be 6.78 MHz and one PTU may supply power to a maximum of 8 PRUs according to geometries and power levels of the power transmitter and the power receiver. A Bluetooth Low Energy (BLE) link of the A4WP system is used for power level control, effective load identification, and incompatible device protection.

Referring to FIG. 5, the A4WP system may include the PTU and PRU and the PTU in this case may be extended to serve a plurality of independent PRUs. Here, serving may mean transmission/supply of the power.

The PTU includes a resonator and matching unit, a power conversion unit and a signaling and control unit (or microcontroller (MCU) & Out-of band signaling) as three main functional units. The PRU may also include the same three main functional units as the PTU.

The resonator and matching unit may perform a resonance frequency, impedance matching, and the like for wireless power transmission and may be implemented separately as a Tx/Rx resonator and a matching circuit as illustrated in the figure. Further, the power conversion unit may perform conversion between an electric signal and a power signal. Further, the signaling and control unit may perform control of other units included in the PTU or PRU, communication control between other units, and bidirectional communication (e.g., Bluetooth communication) with a target PRU or a target PTU.

The PTU may further include a power supply unit supplying the power to the PTU and/or a power amplification unit amplifying the power in addition to the aforementioned units. The PRU may further include a rectifier unit converting alternating current (AC) into direct current (DC) and/or a DC to DC unit in addition to the aforementioned units.

The aforementioned units may be implemented by hardware and provided in the PTU or PRU and integrally implemented as one component or separately implemented as a plurality of components (for each function).

A control and communication protocol of a WPT network is designed in a bidirectional and half-duplex structure and PRU characteristics are signalized and sent to the PTU and a feedback thereof is provided, thereby enabling efficiency optimization, overvoltage protection, low-voltage avoidance, and rogue object detection.

The WPT network is a star topology in which the PTU operates as a master and the PRU operates as a slave. The PTU and the PRU may perform bidirectional communication with each other in order to identify the devices and exchange power negotiation information.

FIG. 6 illustrates a class of a PTU according to an embodiment of the present invention.

Referring to FIG. 6, the PTU may be divided into five classes depending on a capability of the PTU for injecting the power into a PTU resonator and/or the number of supportable PRUs and a category thereof.

The PTU may acquire P_TX_IN_MAX, which is a maximum power value that may be injected into the PTU resonator and P_TX_IN_MAX in this case as an actual power value may be obtained as an average (=Avg(V(t)*I(t)) of a product of V(t) which is a voltage function over time and I(t) which is a current function over time.

P_TX_IN_MAX supportable by the PTU, the category of the PRU, and the number of PRUs may vary for each class. For example, the PTU which is class 2 may inject power up to a maximum of 10 W into the PTU resonator and support one PRU of category 1, 2, or 3. Contrary to this, the PTU which is class 3 may inject power up to a maximum of 16 W into the PTU resonator and support up to a maximum of two PRUs of category 1, 2, or 3 or support one PRU of category 4.

The category of the PRU will be described below with reference to FIG. 7.

FIG. 7 illustrates a category of a PRU according to an embodiment of the present invention.

Referring to FIG. 7, the PRU may be classified into five categories according to the power output from the PRU resonator and/or an applied/executed application/function. The PRU may also acquire P_RX_OUT_MAX, which is a maximum power value that is output from the PRU resonator and P_RX_OUT_MAX in this case as the actual power value may be obtained as the average (=Avg(V(t)*I(t)) of the product of V(t) which is the voltage function over time and I(t) which is the current function over time.

Examples of the maximum power value output by the PRU resonator and the applied application may vary for each category. For example, in the case of the PRU which is category 2, the PRU resonator may output power up to a maximum of 3.5 W and an example of the applicable application may include a feature phone. Contrary to this, in the case of the PRU which is category 3, the PRU resonator may output power up to a maximum of 6.5 W and then example of the applicable application may include a smart phone.

The PRU resonator may not output more than a power value defined for each category. When efficiency of 80% or more is generated at the time of implementing the PRU, 6.5 W is set for the purpose of permitting 5 W.

FIG. 8 illustrates a PTU state model according to an embodiment of the present invention.

Referring to FIG. 8, the PTU state model may include a PTU configuration state, a PTU power saving state, a PTU low power state, a PTU power transfer state, a PTU local fault state, and/or a PTU latching error state. The PTU may have any of the aforementioned states, and the state may be changed based on a power transfer state, a timer, whether the PRU is detected, a system error, a charging state of the PRU, and the like.

Hereinabove, the wireless power transmission/reception system distinguished for each standard and mode has been described.

When the aforementioned contents are summarized, in the case of the inductive mode, wireless charging may be performed by using a magnetic flux induction phenomenon between the primary and secondary coils and a the charging distance may be approximately several centimeters as a short distance. Further, in the case of the inductive mode, it is advantageous in that the charging efficiency is high and it is easy to implement the inductive mode, but it is disadvantageous in that the charging distance is short (relatively to the resonant mode) and aligning coils of the power transmitter and the power receiver is required for charging, and only one-to-one charging is available.

Contrary to this, in the case of the resonant mode, the wireless charging may be performed by using a resonance phenomenon between power transmission and reception coils and the charging distance may be in the range of several centimeters to several meters as a medium distance. Further, in the resonant mode, it is advantageous in that the charging distance is extended up to the unit of m and is long (relatively to the inductive mode) and one-to-many charging is available, but it is disadvantageous in that the size of the coil is large and transmission efficiency is low.

The wireless power transmission/reception system in the inductive mode is standardized mainly in the WPC or PMA organization and in the wireless power transmission/reception system in the resonant mode is standardized mainly in the WPC or A4WP organization.

The power transmitter and the power receiver may be manufactured as a model that supports the inductive mode or the resonant mode according to the manufacturer's choice. When the power transmitter and the power receiver are manufactured/produced so as to support a specific mode according to the manufacturer's free choice, a problem in compatibility between the power transmitter and the power receiver may occur. For example, the power transmitter may charge only the power receiver that supports the same mode as itself and the power receiver may also be charged only through the power transmitter that supports the same mode as itself.

Furthermore, depending on which standard (e.g., WPC and A4WP) is manufactured, the problem in compatibility between the power transmitter and the power receiver may occur. For example, a resonant mode power transmitter manufactured according to the WPC standard may charge only a resonant mode power receiver manufactured according to the same standard and may not charge a resonant mode power receiver manufactured according to the A4WP standard.

The compatibility problem may act as a serous limitation in portable devices which a user continuously carries. Particularly, in recent years, there have been many public places (e.g., airports, restaurants, cafes, parks, etc.) that provide a charging service to increase/satisfy portability of the portable device and when a power transmitter which is compatible is separately present for each power receiver, a burden/cost that the power transmitter needs to be provided for each power receiver increases.

Therefore, in order to solve the compatibility problem, this specification intends to propose a coil structure of a resonator of a power transmitter capable of charging all power receivers regardless of which mode and standard is manufactured. That is, this specification proposes a resonator coil structure that supports both the inductive mode and the resonant and can support both the WPC and A4WP standards. Furthermore, this specification proposes a resonator coil structure in which a problem of magnetic field imbalance on the charging area, which may occur as a result of arrangement of a resonance coil and an induction coil, is improved.

Resonator Coil Structure

The resonator coil structure may basically be proposed as a combination type of a coil that is standardized for the inductive mode in WPC and a coil that is standardized for the resonant mode in A4WP. A more specific resonant coil structure will be described below in detail with reference to FIGS. 11 to 15.

Hereinafter, for convenience of description of the coil structure, first and second directions are defined and here, the first and second directions mean directions orthogonal to each other as relative directions. For example, when the first direction is a transverse/horizontal direction, the second direction may be a longitudinal/vertical direction. Further, the size to be described below may have an error range of approximately 0.5 to 1 mm.

FIG. 9 illustrates a first coil for a resonant mode included in a resonator according to an embodiment of the present invention. In FIG. 9, each numeral indicates the size of an arrow range in a first coil and the unit is mm. However, the sizes exemplified in this drawing are not limited to those described in the drawings, and may have an error range of approximately 5 mm.

Referring to FIG. 9, the first coil operating in the resonant mode may be configured in the form of a wire (e.g., a Litz wire) (or conducting wire) wound/rotated in a specific direction. More specifically, the first coil may be configured in such a manner that a 'wire group' including three wires arranged side by side in the second direction extends to cross in the first and second directions from a center CE. The center CE may be connected to coils placed on an upper surface and a lower surface of a printed circuit board (PCB). In this case, the wire group may extend from the center CE in the form of a rectangular frame in which a space is formed.

For example, the wire group constituting the first coil may be sequentially extended from the center CE with 17 mm in the first direction, extended with 17 mm in the second direction, extended with 38 mm in the first direction, extended with 34 mm in the second direction, extended with 52.5 mm in the first direction, extended with 51 mm in the second direction, extended with 67 mm in the first direction, extended with 59 mm in the second direction, extended with 76 mm in the first direction, extended with 67 mm in the second direction, extended with 85 mm in the first direction, extended with 71 mm in the second direction, extended with 89 mm in the first direction, extended with 75 mm in the second direction, extended with 93 mm in the first direction, extended with 75 mm in the second direction, and then, finally extended with a predetermined length in the first direction. The wire group that last extends in the first direction may perform a function as a terminal OL. The terminal OL may be connected to a circuit including the power amplification unit and the resonance and matching unit.

An extension length of the wire group may be a length measured, which includes a width of the wire group, and the width of one wire may be 1 mm and the width of the wire group in which three wires are arranged in line may be 3 mm.

A ferrite plate for the first coil may be optionally provided in the resonator and the ferrite plate provided in this case may be a Mn—Zn ferrite plate having a thickness of 1.5 mm and initial permeability may be 3200. As such a ferrite plate, TODAISU's PM12 product may be recommended.

According to the above configuration, a total length of the first coil in the first direction may be 75 mm, the total length in the second direction may be 93 mm, and the space may be present in the first coil. A second coil for the inductive mode, which is stacked/coupled with the first coil may transmit power without large interference by the first coil through such a space.

Besides, various parameter values defined with respect to the resonator configured by using the first coil may be determined as shown in Table 1 below.

TABLE 1

| Entry | Value | Value |
|---|---|---|
| Resonator Type | PCB (printed circuit board) Mutli-Mode, Class 2 | 10 W |
| Supported PRUs by Category | Number | |
| Category 1 | 1 | |
| Category 2 | 1 | |
| Category 3 | 1 | |
| Category 4 | 0 | |
| Category 5 | 0 | |
| Resonator current | $I_{TX}$ (Current $mA_{rms}$) | |
| $I_{TX\_MIN}$ | 800 | |
| $I_{TX\_SHORT\_BEACON\_MIN}$ | 800 | |
| $I_{TX\_LONG\_BEACON\_MIN}$ | 800 | |
| $I_{TX\_START}$ | 900 | BSS 1.3 or lower |
| $I_{TX\_NOMINAL}$ | 950 | |
| $I_{TX\_MAX}$ | 1400 | |
| $I_{TX\_ABS\_MAX}$ | 1500 | |
| Max rising edge slew rate | 100 mA/ms | |
| Resonator current derating | Power (W) | |
| Current derating power level | 10 | |
| $Z_{TX\_IN}$ | Minimum (Ohms) | |
| $Z_{PA\_SOURCE\_MIN}$ | 150 | |
| | $X_{TX\_IN}$ (jOhms) | $R_{TX\_IN}$ (Ohms) |
| Nominal Empty Charge Area Impedance | 42.8 | 1.9 |
| Resonator Electrical Characteristics | | |
| Intrinsic Q | 22.21 | |
| Intrinsic L | 1.19 (µH) | |

TABLE 1-continued

| Entry | Value | Value |
|---|---|---|
| $Z_{TX\_IN}$ [Relative to Empty Pad] | $X_{TX\_IN}$ (jOhms) | $R_{TX\_IN}$ (Ohms) |
| Corner 1 | −5 | −1 |
| Corner 2 | −5 | 10 |
| Corner 3 | 5 | 10 |
| Corner 4 | 5 | −1 |
| Allowance for $X_{TX\_IN}$ per PRU category [Relative to Empty Pad] | Minimum (jOhms) | Maximum (jOhms) |
| $X_{TX\_IN\_CAT1}$ | −5 | 5 |
| $X_{TX\_IN\_CAT2}$ | −5 | 5 |
| $X_{TX\_IN\_CAT3}$ | −5 | 5 |
| $X_{TX\_IN\_CAT4}$ | NA | NA |
| $X_{TX\_IN\_CAT5}$ | NA | NA |
| Allowance for $R_{TX\_IN}$ per PRU category [Relative to Empty Pad] | Minimum (Ohms) | Maximum (Ohms) |
| $R_{TX\_IN\_CAT1}$ | −1 | 10 |
| $R_{TX\_IN\_CAT2}$ | −1 | 10 |
| $R_{TX\_IN\_CAT3}$ | −1 | 10 |
| $R_{TX\_IN\_CAT4}$ | NA | NA |
| $R_{TX\_IN\_CAT5}$ | NA | NA |
| Short Beacon PRU-induced Impedance [Relative to Empty Pad] | $X_{TX\_IN}$ (jOhms) | $R_{TX\_IN}$ (Ohms) |
| $Z_{TX\_IN\_LOAD\_CHANGE}$ | 1.0 | 0.5 |
| $Z_{TX\_IN\_LOAD\_DETECT}$ | 0.7 | 0.3 |
| Resonator geometry | Distance (mm) | |
| Length | 93 | |
| Width | 75 | |
| Structural Configuration | PCB | |
| Wire gauge (or trace copper thickness and width) | NA | |
| Trace Copper thickness | 2.0 (oz) | |
| Trace width | 2 (mm) | |
| Distributed Capacitor(s)) | NA | |
| Distributed Capacitor(s) Tolerance | NA | |
| Resonator clearances | Distance (mm) | |
| Clearance to charge surface | 6 | |
| Clearance to enclosure edges | 20 | |
| Clearance to bottom enclosure | 20 | |
| Resonator Charge Area | Dimension (mm) | |
| Length | 87 | |
| Width | 69 | |
| Corner Radius | 6 | |
| Orientation in Relation to Resonator | Center | |
| Resonator Keep-Out Volume | Dimension (mm) | |
| Distance below charge surface | 20 | |
| Length | 120 | |
| Width | 100 | |

Referring to Table 1, the resonator type of the resonator may correspond to the PCB multi-mode and class 2, and a rated output may be 10 W. The resonator is capable of supporting one PRU classified as category 1, 2, or 3. The maximum reception power of the PRU classified as category 1 is 2 W, the maximum reception power of the PRU classified as category 2 is 3.5 W, and the maximum reception power of the PRU classified as category 3 is 6 W. Minimum coil current I_TX_MIN of the resonator may be 800 mA and maximum coil current I_TX_ABS_MAX may be 1500 mA.

Z_TX_IN represents a parameter related to impedance of the power transmitter coupled with the power receiver, X_TX_IN represents a parameter related to reactance for each category of the power receiver coupled with the power transmitter, and R_TX_IN represents a parameter related to resistance for each category of the power receiver coupled with the power transmitter.

In Table 1, the gap/clearance means a space/distance to be secured from the first coil up to a specific surface. Therefore, according to Table 1, a distance from the first coil up to the charge surface needs to be secured as 6 mm, a distance from the first coil up to the enclosure edge needs to be secured as 20 mm, and a distance from the first coil up to the bottom enclosure needs to be secured as 20 mm.

In Table 1, the Resonator Keep-Out Volume means a space in which the power receiver should not be placed in a lower direction (or an opposite direction to the charge surface) of the first coil in order to prevent breakage of the power transmitter and the power receiver. Therefore, according to Table 1, a clearance with a height of 20 mm, a length of 120 mm, and a width of 100 mm should be secured in the lower direction of the first coil and the power receiver should not be placed in the corresponding clearance.

Besides, definitions of the parameters of Table 1 which are not described may follow the WPC standard and the A4WP standard.

FIG. 10 illustrates a second coil for an inductive mode included in the resonator according to an embodiment of the present invention. FIG. 11 illustrates a parameter for defining the second coil according to an embodiment of the present invention. In FIG. 10, each numeral indicates the size of an arrow range in a first coil and the unit is mm. However, the sizes exemplified in this drawing are not limited to those described in the drawings, and may have an error range of approximately 5 mm.

Referring to FIG. 10, the second coil may be constituted by three sub-coils (first to third sub-coils) and the ferrite plate having the thickness of 1.5 mm. The first to third sub-coils may be formed by winding the wire by a predetermined number of turns and may have the form of a rounded rectangular frame with a through hole having a square rounded corner at the center. The first and second sub-coils (side coils) are arranged adjacent to each other (in the first direction) and positioned/stacked on the ferrite plate. The third sub-coil (center coil) may be positioned/stacked on the first and second sub-coils and in particular, positioned/stacked at the centers of/between the first and second sub-coils.

The ferrite plate may have a rectangular shape having a longer length in the first direction than a length in the second direction. For example, the length of the ferrite plate in the first direction may be 93 mm and the length of the ferrite plate in the second direction may be 53 mm. The ferrite plate may be a Mn—Zn ferrite plate having a thickness of 1.5 mm and the initial permeability of the ferrite plate may be 3200. As such a ferrite plate, TODAISU's PM12 product may be recommended.

The first and second sub-coils may be configured to have the same size as each other. The first and second sub-coils may have a length of 44 mm in the first direction and a length of 49 mm in the second direction. A rectangular through-hole having a length of 22 mm in the first direction and a length of 26 mm in the second direction is formed at the centers of the first and second sub-coils.

The third sub-coil may have a total length of 50 mm in the first direction and a total length of 46 mm in the second direction. A rectangular through-hole having a length 26 mm in the first direction and a length of 21 mm in the second direction is formed at the center of the third sub-coil.

Referring to FIG. 11, the type of wire forming the first to third sub-coils may be the Litz wire (Litz wire (105 strands of 0.08 mm) constituted by 105 strands of a wire with a thickness of 0.08) and the thicknesses of the first to third sub-coils may be 1.1 mm.

The sizes of the first and second sub-coils may be 50 mm×46 mm as described above and the number of turns of the wire may be '11'. The sizes of the third sub-coil may be 44 mm×49 mm as described above and the number of turns of the wire may be '12'.

The second coil may be disposed concentrically below the first coil and may be arranged to overlap with the first coil in a plane. A more specific arrangement structure of the first and second coils will be described below with reference to FIGS. 12 and 13.

FIG. 12 is a plan view of the resonator according to an embodiment of the present invention. FIG. 13 is a side view of the resonator according to an embodiment of the present invention as viewed from direction A of FIG. 12.

Referring to FIG. 12, the first and second coils may be arranged so as to overlap with each other in the plane (in a concentric pattern), and in particular, the second coil may be positioned at the center of the first coil. For example, the second coil may be disposed below the first coil and may be disposed by 11 mm away from both outsides in the second directions. As described above, since the space is formed in the first coil, there is no problem in transmitting the power of the second coil to the power receiver through the space of the first coil even if the first and second coils are arranged to overlap with each other in the plane.

Referring to FIG. 13, the resonator may be formed by stacking the first and second coils sequentially from the second coil to the first coil. More specifically, the resonator may be formed by sequentially stacking the ferrite plate, the first and second sub-coils, the third sub-coil, and the first coil. The length from the upper surface of the ferrite plate to the upper surface of the first coil may be 3.85 mm and the length from the upper surface of the third sub coil to the upper surface of the first coil may be set to 1.55 mm.

FIGS. 14 to 16 illustrate an experimental result for a power transmitter including the resonator according to an embodiment of the present invention.

FIG. 14 illustrates a uniformity test result for a power transmitter including the resonator according to an embodiment of the present invention.

In general, when the power transmitter is configured by simply stacking the coil for the resonant mode and the coil for the inductive mode, there is a problem in that two coils are interfered and the magnetic field is not formed uniformly in the charged area. That is, coupling uniformity between the power transmitter and the power receiver in the charging area is greatly reduced due to interference between both coils. However, according to the resonator geometry according to the embodiment, it may be confirmed that the uniformity is maintained at a predetermined level as shown in the experimental result of FIG. 14.

The experimental result of FIG. 14 shows a result of measuring charging voltage at a location (hereinafter, referred to as 'minimum coupling location') at which a coupling coefficient is the minimum and a location (hereinafter, referred to as 'maximum coupling location') at which the coupling coefficient is the maximum when the current of the power transmitter including the resonator geometry is changed within a specific driving range.

Referring to FIG. 14, the charging voltage at the minimum coupling location is measured as 5.71 V and the charging voltage at the maximum coupling location is measured as 10.86 V. This may be interpreted as a case where the charging voltage in the charging area of the power transmitter including the resonator geometry is changed only within a specific voltage range (i.e., a range of 5 V to 16 V) and the uniformity of the charging area is satisfied. This may particularly mean that charging may be performed only when voltage of 5 V or more is transmitted and a power receiver which is broken when voltage of 16 V or more is transmitted may be stably charged even though the power receiver is placed in any charging area.

Besides, although not illustrated in the drawing, it is measured that the uniformity of the charging area is satisfied by the resonator geometry according to an embodiment of the present invention with respect to all of three types of authentication power receivers which are used as a standard for adopting a coil standard of the power transmitter in the A4WP standard.

FIG. 15 is a graph of an experimental result illustrating an impedance change amount for each position of the power transmitter depending on the position of the power receiver. An x-axis represents the reactance, which is an imaginary number part of the impedance of the power transmitter and a y-axis represents the resistance, which is a real number part of the impedance.

When the power receiver is positioned in the charging area of the power transmitter, the impedance of the power transmitter is changed with the location of the power receiver. In this case, there is an effect that the impedance change amount of the power transmitter depending on the location of the power receiver is smaller, impedance matching become easier, and as a result, the impedance matching circuit of the power transmitter becomes simpler. Therefore, as the impedance change amount is smaller, power transmission efficiency increases and circuit complexity of the power transmitter is reduced.

An experimental result graph of FIG. 5 is a graph in which an impedance change of the power transmitter is shown while moving the three types of authentication power receivers from the minimum coupling location of the power transmitter to the maximum coupling location.

Referring to FIG. 15, it may be confirmed that the impedance of the power transmitter is changed within the range of minimum −4 jΩ to maximum 4 jΩ according to the location of the power receiver and the impedance of a + load. When it is considered that the impedance of the general power transmitter is changed within the range of minimum −10 jΩ to maximum 10 jΩ, it may be confirmed that the impedance of the power transmitter according to the present invention is changed within a very small range.

FIG. 16 illustrates an experimental result for resonate coupling efficiency (RCE) for a power transmitter including a resonator geometry according to an embodiment of the present invention.

Referring to FIG. 16, it can be confirmed that the RCE of the power transmitter is measured as 77.83% and the power transmitter thus has very high charging efficiency.

According to the experimental results shown in FIGS. 14 to 16, it may be confirmed that the power transmitter including the resonator has excellent performance in terms of the uniformity of the charging area, the impedance change amount, and the charging efficiency.

The resonator according to an embodiment of the present invention detects the power receiver placed in the charging area, recognizing/detecting in which mode/standard the power receiver operates, and then, selectively and appropriately drives the first or second coil according to the support mode/standard of the power receiver to charge the power receiver. As a result, according to an embodiment of the present invention, there is an effect that the power transmitter may charge power receivers of various mode/standards.

Although the drawings have been described for the sake of convenience of explanation, it is also possible to design a new embodiment to be implemented by merging the embodiments described in each drawing. Further, configurations and methods of the described embodiments may not be limitedly applied to the aforementioned present invention, but all or some of the respective embodiments may be selectively combined and configured so as to be variously modified.

Further, while the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

INDUSTRIAL APPLICABILITY

The present invention may be applied to various wireless charging technologies.

The invention claimed is:
1. A resonator transmitting power in a resonance mode, the resonator comprising:
a first coil having a wire group including three wires arranged in line and alternately extended in first direction and second direction orthogonal to the first direction; and
a second coil including three sub-coils and ferrite plates,
wherein the first coil is stacked adjacent to the second coil, and the first coil corresponds to a resonance coil driven in the resonance mode and the second coil corresponds to an induction coil driven in an induction mode, respectively.

2. The resonator of claim 1, wherein a width of each of the three wires is 0.5 to 1.5 mm.

3. The resonator of claim 2, wherein the first coil is configured in a rectangular shape having a space therein.

4. The resonator of claim 3, wherein a total length of the first coil is 92 to 94 mm and a total width is 74 to 76 mm.

5. The resonator of claim 4, wherein the wire group is sequentially extended from a center of the first coil with 16 to 18 mm in the first direction, 16 to 18 mm in the second direction, 37 to 39 mm in the first direction, 33 to 35 mm in the second direction, 51.5 to 53.5 mm in the second direction, 50 to 52 mm in the second direction, 66 to 68 mm in the first direction, 58 to 60 mm in the second direction, 75 to 77 mm in the first direction, 67 mm in the second direction, 84 to 86 mm in the first direction, 70 to 72 mm in the second direction, 88 to 90 mm in the first direction, 74 to 76 mm in the second direction, 92 to 94 mm in the first direction, and 74 to 76 mm in the second direction and connected to a terminal of the first coil.

6. The resonator of claim 1, wherein when the three sub-coils have first to third sub-coils,
the first sub-coil is arranged in line neighboring to the second sub-coil in the first direction and the first and second sub coils are stacked on the ferrite plate, and
wherein the third sub-coil is stacked between the first and second sub-coils.

7. The resonator of claim 6, wherein the first to third sub-coils have a square-shaped frame with rounded corners, and
wherein the square-shaped frame has a through hole having a rectangular shape with rounded corners at center.

8. The resonator of claim 7, wherein the first and second sub-coils are configured to have the same size and configured to have a different size from the third sub-coil.

9. The resonator of claim 8, wherein the number of turns of wires of the first and second sub-coils is 11 and the number of wire of the third sub-coil is 12, and wherein thicknesses of the first to third sub-coils is 0.6 to 1.6 mm.

10. The resonator of claim 9, wherein a length of the first and second sub-coils in the first direction is 43 to 45 mm and the length in the second direction is 48 to 50 mm, and wherein the length of the through-hole of the first and second sub-coils in the first direction is 21 to 23 mm and the length in the second direction is 25 to 27 mm.

11. The resonator of claim 10, wherein the length of the third sub-coil in the first direction is 49 to 51 mm and the length in the second direction is 45 to 47 mm, and wherein the length of the through-hole of the third sub-coil in the first direction is 25 to 27 mm and the length in the second direction is 20 to 22 mm.

12. The resonator of claim 11, wherein the length of the ferrite plate in the first direction is 92 to 94 mm and the length in the second direction is 52 to 54 mm.

13. The resonator of claim 6, wherein when the first coil is stacked on the third sub-coil included in the second coil, a distance from an upper surface of the ferrite plate up to the upper surface of the first coil is 2.85 to 4.85 mm and the distance from the upper surface of the third sub-coil up to the upper surface of the first coil is 0.55 to 2.55 mm.

14. The resonator of claim 13, wherein the second coil is positioned 10 to 12 mm away from both outsides of the first coil in a plane.

15. A wireless power transmitter transmitting power to a wireless power receiver, the wireless power transmitter comprising:

a power supply unit supplying the power to the wireless power transmitter;

a matching circuit performing impedance matching;

a resonator transmitting the power to the wireless power receiver; and a control unit performing out-of-band communication, wherein the resonator includes a first coil having a wire group including three wires arranged in line and alternately extended in first direction and second direction orthogonal to the first direction, and a second coil including three sub-coils and ferrite plates, and wherein the first coil is stacked adjacent to the second coil, and the first coil corresponds to a resonance coil driven in the resonance mode and the second coil corresponds to an induction coil driven in an induction mode, respectively.

* * * * *